May 24, 1932.  V. V. VEENSCHOTEN  1,859,544
FEED WATER REGULATOR
Filed Dec. 5, 1929    2 Sheets-Sheet 1
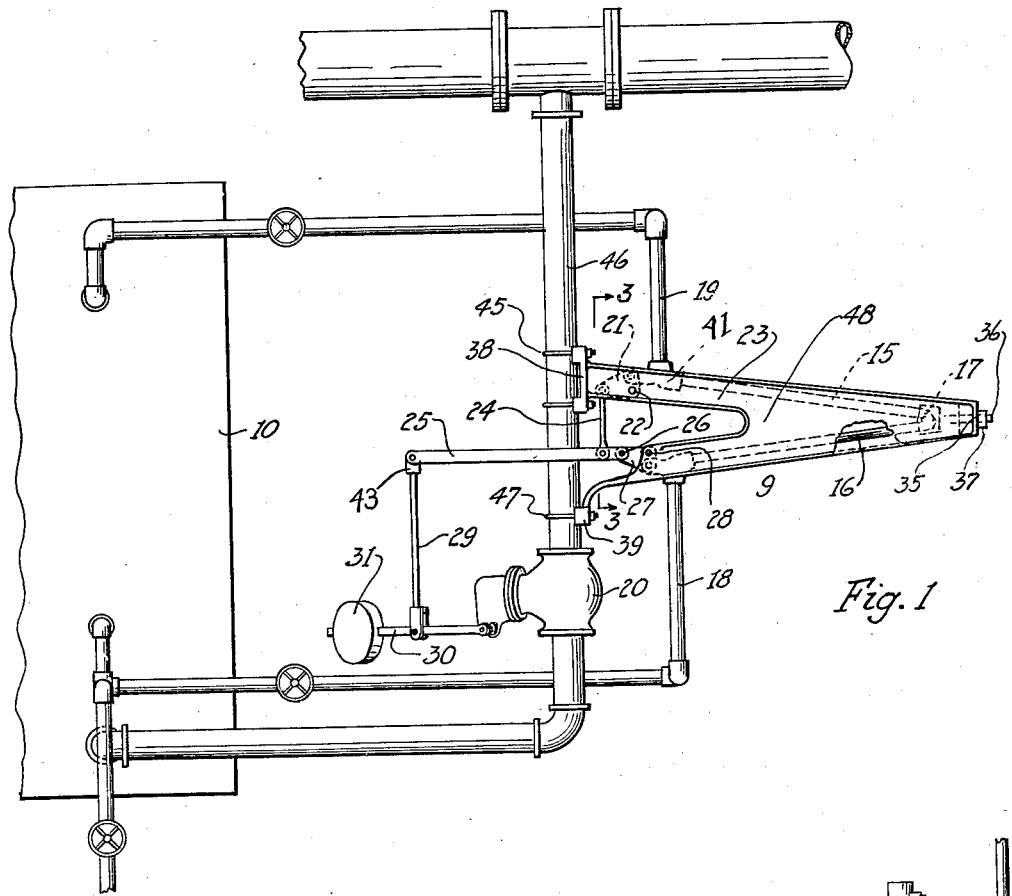
Fig. 1
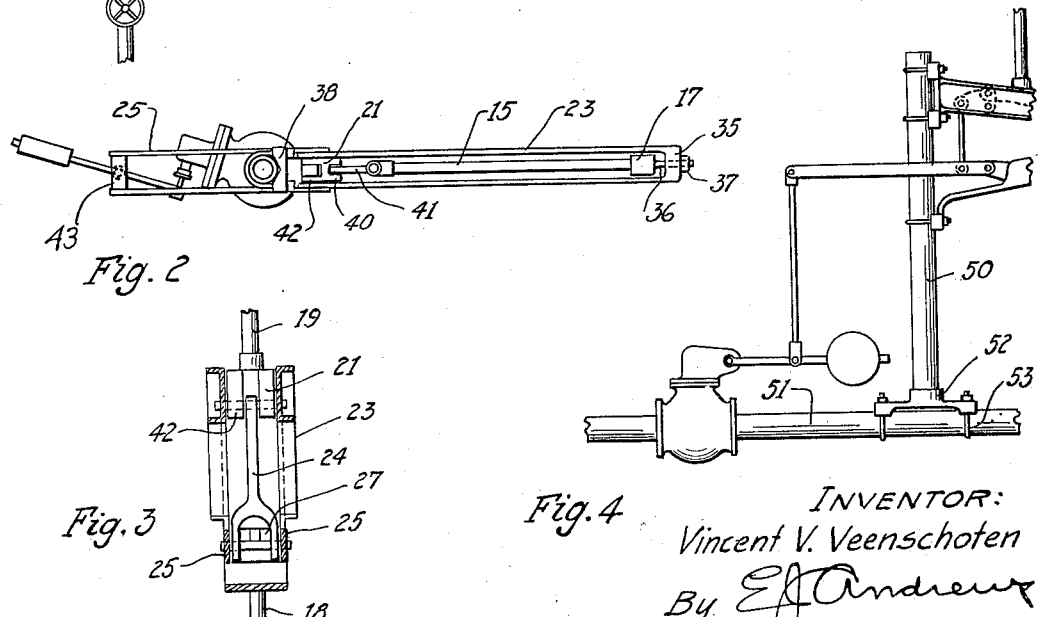
Fig. 2
Fig. 3
Fig. 4
INVENTOR:
Vincent V. Veenschoten
By E. J. Andrews
Atty.

May 24, 1932. V. V. VEENSCHOTEN 1,859,544
FEED WATER REGULATOR
Filed Dec. 5, 1929 2 Sheets-Sheet 2

Inventor:
Vincent V. Veenschoten.
By E. J. Andrews
Att'y.

Patented May 24, 1932

1,859,544

UNITED STATES PATENT OFFICE

VINCENT V. VEENSCHOTEN, OF ERIE, PENNSYLVANIA, ASSIGNOR TO NORTHERN EQUIPMENT COMPANY, OF ERIE, PENNSYLVANIA, A CORPORATION OF PENNSYLVANIA

FEED WATER REGULATOR

Application filed December 5, 1929. Serial No. 411,803.

Figure 5:
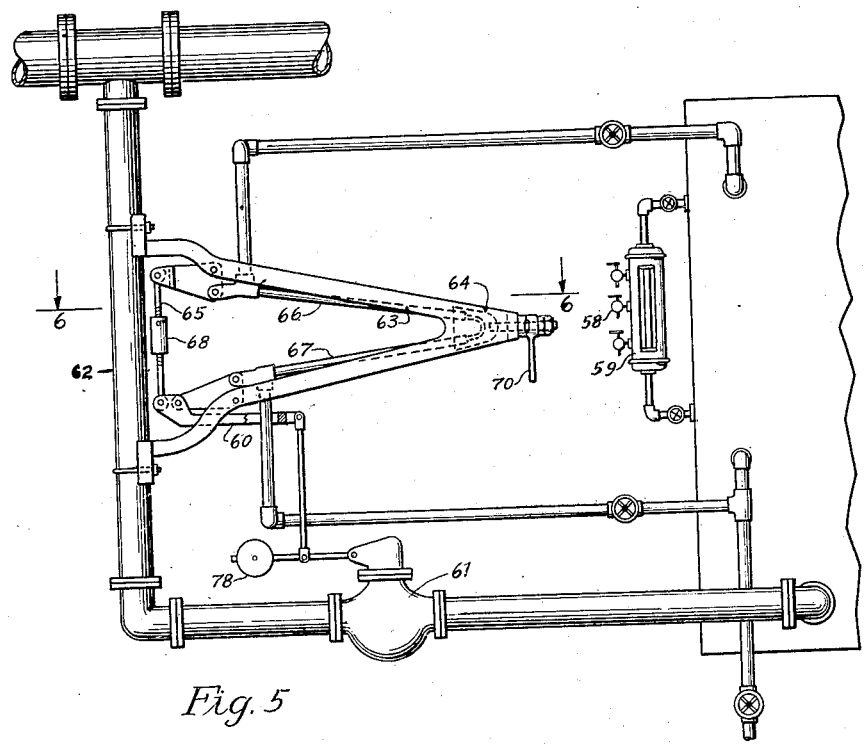
Figure 6:
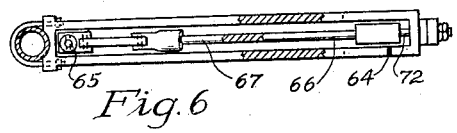
Figure 7:
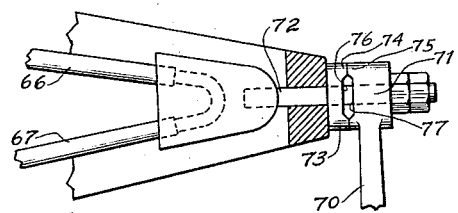

This invention relates to feed water regulators for controlling the flow of water to steam boilers and for other similar purposes. The regulators are of the thermostatic or expansion tube type. One of the objects of the invention is to provide a regulator which is very simple, compact and powerful, and so arranged as to eliminate lateral stresses which tend to strain the apparatus, and to eliminate also any straining effects of other necessary stresses on the apparatus. Another object of the invention is to provide means for quickly and conveniently installing the regulator and for dismounting it when desired. Other objects will be apparent from a consideration of the accompanying drawings and the following description thereof:

Of the drawings, Fig. 1 is an elevation of a feed water regulator system which embodies the features of my invention; Fig. 2 is a plan view of the regulator system; Fig. 3 is an enlarged sectional view along the line 3—3 of Fig. 1; Fig. 4 is an elevation of somewhat modified means for mounting the regulator; Fig. 5 is an elevation of a modified form of regulator system; Fig. 6 is a plan view of the same; and Fig. 7 is an enlarged view of the means for connecting the regulator to its support.

In this instance, I have shown the regulator 9 associated with a boiler 10. The regulator is designed to maintain the water level elevation in the boiler within certain limits, the average or normal water level being substantially at the same elevation as the central portion of the regulator. The thermostat itself comprises a V-shaped or U-shaped tube; or, as is indicated, it may comprise the two tubes 15 and 16 suitably connected, by means of a coupling head 17, or otherwise, so that the tubes freely communicate with each other.

The coupling 17 is fixed in position, as hereinafter described, and the free ends of the tubes are connected respectively to the water space and the steam space of the boiler, by means of pipes 18 and 19, so that water stands in the tubes at about the same elevation as in the boiler, and it rises and sinks in the tubes in accordance with the changes in water level in the boiler. The free ends of the thermostat are operatively connected with the feed water valve 20, so that, as the water level in the tubes sinks and the tubes expand more, the valve will be opened more, in order to allow more water to pass into the boiler. Or, as the water rises in the tubes, the reverse operation will occur.

The means connecting the thermostat with the tubes comprises a system of levers. The free end of the tube 15 is connected to a bell crank lever 21, having its fulcrum 22 mounted in the frame 23, which supports the thermostat. The outer end of the lever 21 is connected by a link 24 to a lever 25. The lever 25 has its fulcrum 26 in the outer end of a bell crank lever 27 which is pivoted to the frame at the point 28. The lever 27 is also pivoted to the free end of the tube 16. A consideration of this leverage will show that, whenever either of the tubes decreases in length, the lever 25, by means of the link 29, will elevate the lever 30 which, in turn, will close more the valve 20. And, when either of the tubes expands, the weight 31 will be allowed to lower the lever 30 and open more the valve.

As is well understood, thermostatic regulators of this nature are required to have a leverage sufficient to move the valve a far greater distance than the variation in length of the thermostat tubes, owing to the variation in temperature. A leverage of twenty to one or more is common, and a much greater leverage than this is usually required to operate the weight 31. As a consequence, enormous forces act on the operating means and, if the arrangement is such that the frame or leverage can yield under stresses, the effect of the expansion or contraction of the tubes is materially decreased and will be entirely negligible if the variation in water level in the tube is not very material.

One of the objects of this invention is to arrange the relative parts of the apparatus so as to eliminate all strains owing to any of the stresses involved, so as to provide movement of the valve exactly corresponding to the variations in lengths of the tubes at all times, even though the variation in water level may be very slight.

In order to avoid any effects of loose play, it is common with feed water regulators of this nature to operate the valve by means of a weight, such as the weight 31. As a consequence of this arrangement, it is necessary for the operating means to exert forces far greater than would be necessary merely to move the feed water valve plunger in its casing. The weight must be sufficiently massive to operate the valve when allowed to do so, and to have a large margin of force to overcome any abnormal sticking. As a consequence, the leverage must overcome much more than twice as much resistance as if the valve alone were moved. Hence, enormous forces act on the system, it being well understood that, when a metal expands, it will exert sufficient force for this purpose.

I have, therefore, provided a frame 23 on which no material forces act, except the forces of compression. The frame comprises a V-shaped member 23 on each side of the tubes, with the arms of the frames substantially paralleling the respective tubes 15 and 16. The frames are connected at the apex by the cross piece 35, to which the coupling 17 is connected by means of a rod 36 and a nut 37 threaded onto the rod. By means of this nut, the relative positions of the coupling and the frame may be adjusted, so as to vary the position of the thermostat with reference to the levers, as is common with other regulators. The other end of the two V-shaped members of the frame are suitably connected, and the tubes and bell crank levers are mounted between the two frame members.

As a consequence of this arrangement, as the tubes contract or expand, there are no lateral stresses in any way acting on the frame, and no possibility of yielding of the frame or of the tubes, except by compression of the frame or stretching of the tubes and, obviously, the size of both the frame and the tubes may be sufficient to avoid any possibility of either of such effects.

Also, the leverage system is similarly arranged. The bell crank levers 21 and 27 have arms 40 extending each side of the coupling members 41 which connect the thermostatic tubes with the lever, so that all lateral stresses are removed from those elements. Also, arms 42 extend from the bell crank lever 21 each side of the link 24; while the bell crank lever 27 projects between the two arms of the lever 25, and the lever 25 and the link 29 are connected by a head 43, positioned between the outer ends of the two arms of the lever 25.

It will thus be seen that there is no possibility of any material lateral stresses either on the tubes themselves or the frame supporting the tubes or the leverage connecting the tubes with the valve.

A feature of the stabilizing of the system, so as to avoid any strains, is the method of connecting the two ends of the arms of the frame work. The member 38 which connects the two branches of the upper arm, when the system is installed, is firmly clamped, by means of the U-shaped bolts 45, to a pipe 46. In this instance, the pipe is the feed-water pipe of the boiler and preferably so, as the valve 20 is mounted in the same pipe and this insures complete rigidity between the frame and the valve itself. Also, the lower branches are connected by the member 39 which is clamped to the same pipe, by means of a U-shaped bolt 47. So that the two outer ends of the arms are rigidly connected, by means of the pipe 46, and this assists in preventing any possibility of undesirable strains in the frame work. At the same time, the two arms of each of the side members of the frame are connected, by means of a web 48, the web extending so far as may be desired towards the outer ends of the arms.

In mounting or installing a system of this nature properly, in connection with the boiler and the feed water valve thereof, much difficulty is often encountered in finding a suitable location for mounting the regulator, and also in properly connecting it up with the supporting means. But, by the method indicated for supporting and mounting the regulator as hereinabove described, the regulator may be very quickly and conveniently installed, as it is necessary only to connect it to the feed water pipe, as indicated, and then connect up the pipes 18 and 19 leading to the boiler. As there is always a feed water pipe available, and as the exact direction in which the frame projects from the pipe is not very material, the installation may usually be very quickly and conveniently made.

In Fig. 4, I illustrate means for mounting the regulator to a support 50 which is fixed to the feed water pipe 51 when the pipe is horizontal. In this case, the frame work is fixed to the pipe 50 in the same manner as is indicated in Fig. 1, but the pipe 50 is connected to the feed pipe 51 by means of the block 52 and bolts 53. In this case, the rest of the system is substantially the same as is hereinabove described, but variations well understood by those skilled in the art may be made for properly connecting the thermostatic tubes with the valve.

Fig. 5 illustrates some modifications and additions of the feed water regulator, most of which, however, are equally applicable to the structure shown in Fig. 1. This modification is somewhat more compact as the floating lever 60 projects backwardly under the thermostatic tubes and is connected to the feed water valve 61, so that the upward pull on this valve falls beneath the supporting frame work of the tubes. In order to more definitely describe the invention and, particularly, to show the enormous stresses which need to be overcome, the structural drawing of Fig. 5 is drawn to scale. It is not thought necessary to give the actual dimensions but they can be roughly determined by a consideration of the fact that the upright pipe 62, which supports the frame, has an external diameter of 2.375 inches, and it will be seen that the total leverage of the system is in the neighborhood of one to twenty.

In order to assist in properly installing the regulator, I provide indicating notches 63 and 64 in the frame work, which are mounted in a horizontal line and preferably at an elevation similar to the average or normal water level in the boiler, which presumably is to be about at the middle pet-cock 58 of the water column 59. To install properly, a string is stretched from the central pet-cock across these notches, and the frame is thus positioned accurately.

Also, to assist in properly adjusting the various levers, I provide in the link 65 which connects the levers of the two tubes 66 and 67 a turn-buckle 68. Obviously, by adjusting this turn-buckle, the most efficient relative position of the levers will be arrived at. This turn-buckle also assists in varying the magnitude of the opening of the feed water valve 61 with reference to the length of the thermostatic tubes. Inasmuch as the arrangement of the various parts of this modified structure of Fig. 5 is obvious from the description of the other structure, it is not thought necessary to add further description here.

It is sometimes desired to throw the feedwater regulator out of service in a simple manner, and this I provide for by means of an arm 70, having a head 71 which is rotatably mounted on the bolt 72 which connects the ends of the tubes to the frame. This head is adapted to coact with the washer 73 non-rotatably mounted on the same bolt. In this washer and in the head are projecting portions 74 and 75 and recesses 76 and 77. When the arm 70 is in the position shown, the apparatus is in operative condition. But, if the arm is rotated through 90°, the projections will enter the recesses and allow the bolt 72 to move inwardly a sufficient distance to entirely offset the maximum change in length of the tubes as they are heated or cooled.

It will be understood that the connections of the tubes to the boiler are of sufficient length and arranged properly to allow the pipes to yield sufficiently as the tubes contract and expand, and also to allow the weight 78 to fully open the valve when the arm 70 is rotated to render the system inoperative.

I claim as my invention:

1. A boiler system comprising a feed water pipe, a feed water valve mounted in said pipe, a frame comprising two similar spaced V-shaped members, means rigidly connecting the apexes of the members together, means rigidly connecting the ends of the branches of the members with said pipe, a thermostatic feed water regulator mounted between said members, one end of said regulator being connected to said frame, and means operatively connecting the other end of said regulator with said valve and with said frame.

2. A boiler system as claimed in claim 1, in which said connecting means comprise a lever having its fulcrum fixed to said frame, and having one arm pivotally connected with said regulator, and the other arm operatively connected with said valve.

3. A boiler system as claimed in claim 1, in which said regulator comprises a V-shaped tube having its apex fixed to the means connecting the apexes of said frame, the arms of said tube mounted between the arms of said V-shaped members, and being substantially parallel therewith.

4. A boiler system comprising a boiler, a feed water valve and a feed water regulator for controlling the flow of water to the boiler though said valve in accordance with the water level elevation in the boiler, said regulator comprising a V-shaped tube with one branch higher than the other, communicating means connecting the ends of the branches with the boiler, operating means connecting each of said ends with said valve, said means comprising a floating bar, one of said ends being pivotally connected by a lever with one end of said floating bar, and the other end being pivotally connected by a lever with another portion of said bar, and the other end of the bar being operatively connected with said valve, a V-shaped frame member positioned on each side of the tube with its branches substantially parallel with the branches of the tube, means connecting the apex of the tube with the apexes of the members, both said levers being fulcrumed in the frame members.

5. A feed water regulator comprising a V-shaped tube, a support for said tube, the outer ends of the branches of said tube being adapted to be operatively connected respectively with the steam space of the boiler and the water space of the boiler, the other ends of the branches being fixed to said support and communicating with each other, a floating lever, lever means connecting each of the outer ends of the branches with one end portion of said lever at spaced points, and means connecting the other end of said lever with said valve, a V-shaped frame mounted on one side of said tube and with its branches substantially parallel therewith, the apexes of the frame and tube being connected together, said lever means being fulcrumed on the respective ends of the frame branches.

6. A boiler system comprising a boiler, a feed water pipe and a feed water valve, a feed water regulator comprising a V-shaped thermostatic tube, two V-shaped frame members, the said members being positioned parallel and spaced, with their apexes and the ends of their arms rigidly connected together, the said tube being positioned between the frame members and parallel therewith, means connecting the apex of the tube with the frame apex connecting means, means providing communication between the other ends of the tube and the steam space and the water space of the boiler, the feed water pipe being operatively connected with the boiler, the valve being connected in said pipe, and means operatively connecting said tube ends with said valve.

7. A boiler system as claimed in claim 6, in which said operatively connecting means are also connected to the ends of the arms of the frame members.

8. A boiler system as claimed in claim 6, in which the ends of the arms of the frame members are rigidly connected with said pipe.

9. A boiler system as claimed in claim 6, in which said operatively connecting means are also connected to the ends of the arms of the frame members, and the ends of the arms of the frame members are detachably and rigidly connected to said pipe.

10. A feed water regulator comprising a V-shaped tube, a support for said tube, the outer ends of the branches of said tube being adapted to be operatively connected respectively with the steam space of the boiler and the water space of the boiler, the apex of said tube being fixed to said support, a floating lever, lever means connecting each of the outer ends of the branches with one end portion of said lever at spaced points, and means connecting the other end of said lever with said valve, said support comprising a V-shaped frame mounted on one side of said tube and with its branches substantially parallel therewith, the apexes of the frame and tube being connected together, said lever means being fulcrumed on the respective ends of the frame branches, the floating lever having its valve connected end under the central portion of said tube.

11. In a boiler system, a thermostatic tube feed water regulator and a feed water valve, means for connecting one portion of said regulator with said valve, a support for said tube, means for connecting another portion of said tube with a point of said support, means acting on said valve connecting means tending to pull said tube away from said support point, and means, operative between said tube and said support point, for allowing said tube to move away from said support point.

12. Boiler system as claimed in claim 6 in which said latter means tend to shift relatively said frame and two apexes, and which includes means for allowing said frame and tube apexes to be shifted relatively.

13. In boiler system a feed water regulator comprising a V-shaped tube, the outer ends of the branches of said tube being adapted to connect respectively with two spaced portions of the boiler of said system, operating means for connecting each of said ends to the feed water valve of the boiler, and a V-shaped frame mounted on one side of said tube with its branches substantially parallel with said tube branches, the apex of said tube being fixed to the apex of said frame.

14. A boiler system comprising a boiler, a feed water pipe and a feed water valve, a feed water regulator comprising a V-shaped thermostatic tube, two frame members, the said members being positioned parallel and spaced with their respective adjacent ends rigidly connected together, the said tube being positioned between the frame members and parallel therewith, means rigidly connecting the apex of the tube with one pair of the frame ends, means providing communication between the other ends of the tube and the steam space and the water space of the boiler, the feed water pipe being operatively connected with the boiler, the valve being connected in said pipe, and means operatively connecting said tube ends with said valve and with said frames.

In testimony whereof, I hereunto set my hand.

VINCENT V. VEENSCHOTEN.